Sept. 5, 1950 H. P. ROTH 2,521,310
OXYGEN DEMAND PRESSURE BREATHING REGULATOR
Filed June 19, 1945 2 Sheets-Sheet 1
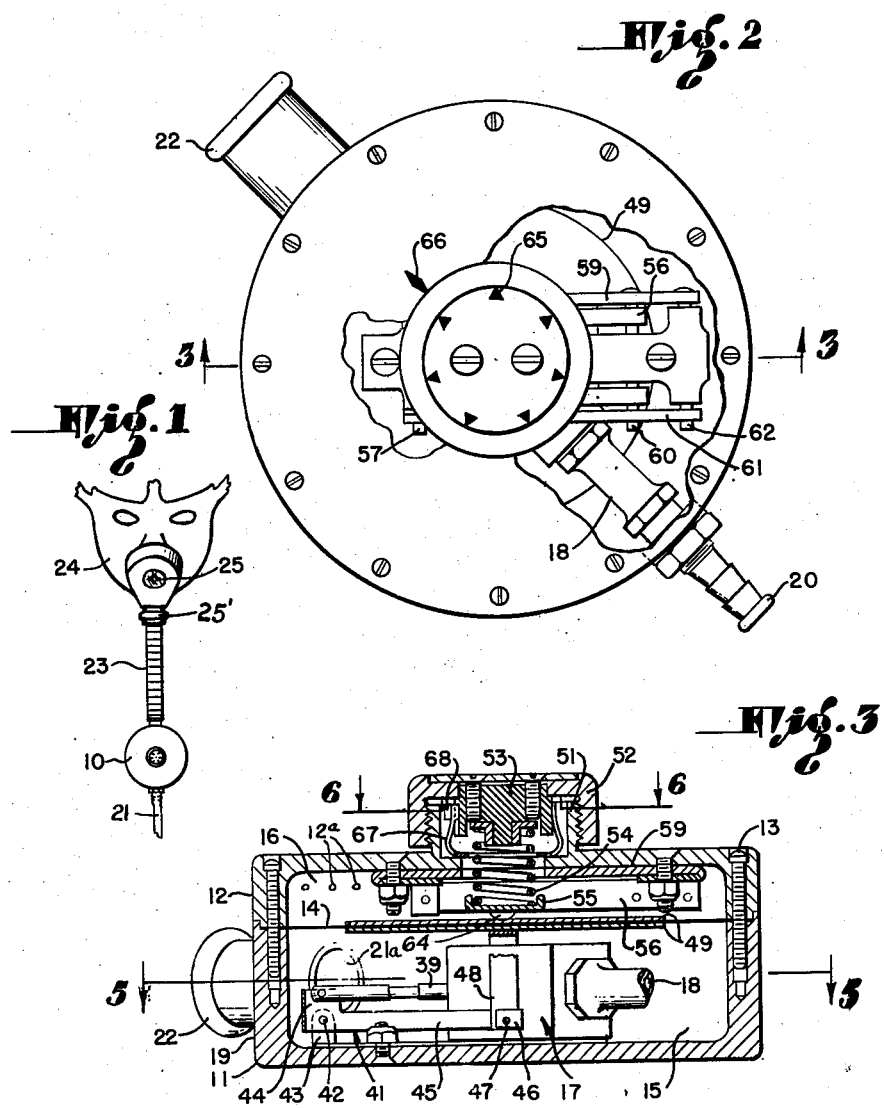
INVENTOR.
HERMAN P. ROTH
BY
ATTORNEY Sept. 5, 1950 H. P. ROTH 2,521,310
OXYGEN DEMAND PRESSURE BREATHING REGULATOR
Filed June 19, 1945 2 Sheets-Sheet 2
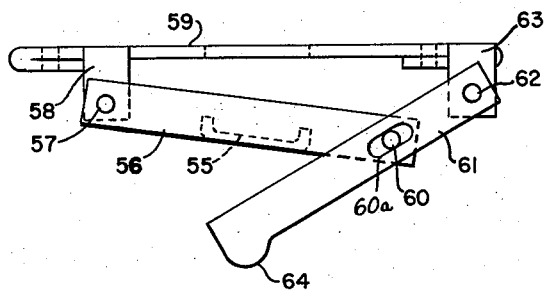
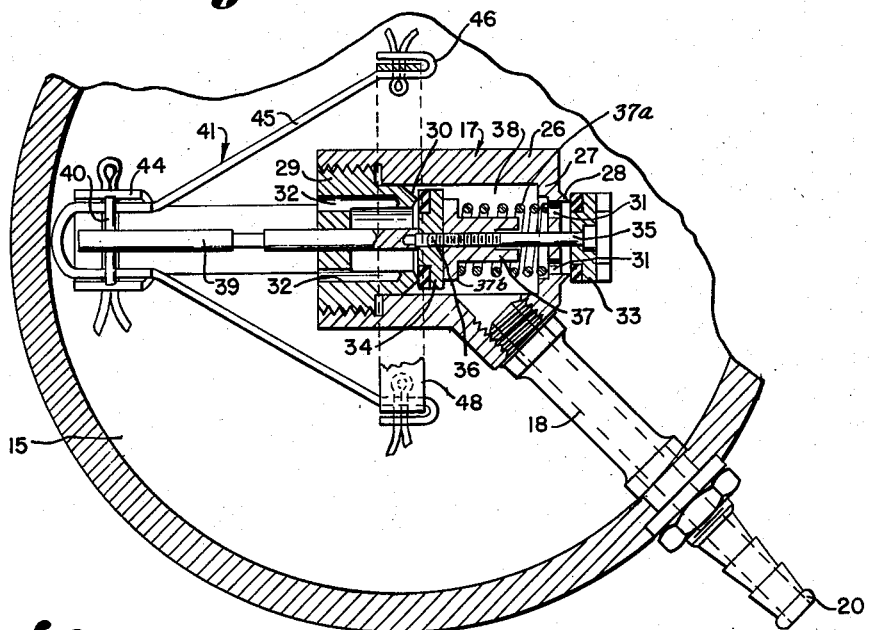
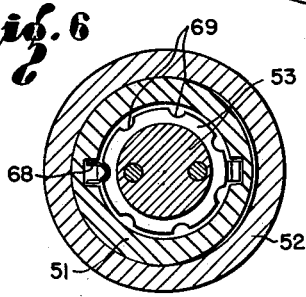
INVENTOR.
HERMAN P. ROTH
BY
ATTORNEY Patented Sept. 5, 1950

2,521,310

UNITED STATES PATENT OFFICE 2,521,310

OXYGEN DEMAND PRESSURE BREATHING REGULATOR

Herman P. Roth, Redondo Beach, Calif., assignor to The Garrett Corporation, Airesearch Manufacturing Company division, Los Angeles, Calif., a corporation of California Application June 19, 1945, Serial No. 600,361

4 Claims. (Cl. 128—142)

This invention relates to apparatus for controlling the supply of oxygen under pressure, through an oxygen mask or other breathing outlet, to a human being for handling the requirements for adequate breathing at high altitudes.

It is recognized that the human lungs at altitudes from 10,000 to 30,000 feet require for adequate breathing air which is progressively richer in oxygen at the higher altitudes, and that above 30,000 feet, even though pure oxygen is breathed, physiological impairment of the bodily functions will become increasingly felt until at altitudes in the vicinity of 40,000 feet, it becomes necessary in order to avoid serious or disabling impairment of faculties, to supply oxygen to the lungs under pressure greater than atmospheric pressure. This may be accomplished by either placing the atmosphere within an aircraft cabin under pressure or by supplying oxygen or an oxygen mixture directly to the respirational organs of an individual. It is with the latter class of apparatus that the present invention deals, and a general object of the invention is to provide an improved and simplified regulator for controlling the supply of oxygen or an oxygen mixture to the respirational organs in such a manner as to permit natural breathing under pressure without the need for expenditure of more than normal breathing efforts.

In general, the invention is embodied in a control device comprising a chamber having a connection to a suitable source of oxygen under pressure and another connection which leads to a mask worn by the user, the flow of oxygen through the chamber being controlled by a valve which, in turn, is controlled by a diaphragm or other device sensitive to variations in pressure in the chamber produced by inhalation and exhalation of the user. When the user inhales, the pressure within the chamber is slightly reduced, the diaphragm causes the oxygen inlet to open, and oxygen flows through the chamber to the mask. When inhalation is terminated, the pressure within the chamber rises, the diaphragm causes the oxygen inlet to close, and a further rise in pressure caused by exhalation will effect the opening of an exhalation valve. In prior devices it has been proposed to embody such an exhalation valve in the chamber of the control device itself. The present invention contemplates the utilization of an oxygen mask having a suitable exhalation valve and the provision of a regulator which simply permits a oneway flow therethrough in response to inhalation and upon exhalation builds up a back pressure in the mask which causes the outlet valve to open. Such an arrangement has the very definite advantage of providing for the immediate discharge of foul air from the mask and the maintenance at all times of a column of pure, uncontaminated, oxygen within the tube connecting the regulator to the mask, plus the added advantage of not causing condensation and freezing in the regulator 10 and connection 23 leading from the regulator 10 to the mask 24, should the apparatus be used in low temperature surroundings.

One of the objects of this invention is to provide a regulator capable of adjustment to vary the pressure at which the oxygen is supplied to the lungs.

Another object is to provide a regulator which will assure consistent ease of breathing and proper balance between inhalational and exhalational pressure differentials throughout the range of pressures to which the regulator may be adjusted.

A further object is to provide a regulator which renders inhalational effort and the rate of oxygen inflow relatively independent of the oxygen supply pressure within its usual limits of variation.

Another object is to provide an oxygen demand regulator having an oxygen inlet valve which is controlled by a diaphragm which is in turn controlled by the oxygen pressure on one side thereof and adjustable spring loading on the other side thereof, the spring loading determining the pressure at which the valve will open.

A further object of the invention is to provide a regulator embodying a valve which, although substantially independent of variations in pressure at the oxygen source, is nevertheless adapted to respond to said pressure so as to utilize a small pressure differential for holding the valve in its closed position.

Further objects and advantages of the invention will be brought out in the following part of the specification.

Referring to the drawings which are for illustrative purposes only:

Fig. 1 is a view of an oxygen mask with the regulator of my invention connected thereto;

Fig. 2 is a plan view of the regulator with a portion of the cover removed to disclose the internal mechanism thereof;

Fig. 3 is a transverse sectional view of the regulator taken on the line 3—3 of Fig. 2;

Fig. 4 is a detail view of the linkage which transfers the spring pressure on the adjusting mechanism to the diaphragm;

Fig. 5 is a detail sectional view of the valve and the lever mechanism for operating the same, taken on the line 5—5 of Fig. 3; and Fig. 6 is a detail sectional view taken on the line 6—6 of Fig. 3, illustrating the adjusting mechanism.

As an example of one form in which the invention may be embodied, I have shown in the drawings a regulator, indicated generally at 10, comprising a main casing section 11 and a cover 12 secured together by screws 13. Clamped between the casing sections 11 and 12 is a diaphragm 14 which cooperates with the casing sections 11 and 12 to define a pair of chambers 15 and 16.

Within the chamber 15 is a valve unit, indicated generally at 17, which controls the flow of oxygen into the chamber 15. Oxygen under pressure from a suitable source (such as an oxygen bottle) is delivered to the valve unit 17 through a connection 18 extending through the peripheral wall 19 of the casing section 11, the outer end of the connection 18 having a nipple 20 for the attachment thereto of an oxygen hose 21, Fig. 1. Oxygen is admitted to the chamber 15 by the valve 17 and flows through an outlet port 21a (Fig. 3) in an outlet connection 22, to a flexible hose 23 of a conventional oxygen mask 24. The mask 24 has an outlet valve 25 for exhalation and an inlet check valve 25' for inhalation. Inhalation is effected by the flow from the connection 18 to the valve 17, thence into the chamber 15, then through the outlet port 21 through the hose 23 and the inlet check valve and to the mask 24.

The valve 17 comprises a valve casing 26 having an end wall 27 formed with an integral exterior valve seat 28 and having at its other end a threaded insert 29 providing an internal valve seat 30. The end wall 27 and insert 29 are each provided with a plurality of valve ports 31 and 32 respectively, which are collectively of adequate area to permit the oxygen to flow into the chamber 15 at an adequate rate to satisfy normal requirements. A valve 33 cooperates with the valve seat 28 to close the port 31 and a valve 34 cooperates with the valve seat 30 to close the port 32. The valves 33 and 34 are connected by a stem 35 which extends through the valve 33 and is threaded at 36 into the valve 34. By threading or unthreading the stem 35 in the valve 34, the relative positions of the two valves may be adjusted so as to attain the proper cooperative seating of both valves simultaneously. A lock nut 37 is employed to lock the adjustments thus obtained, and a spring 37a reacts between a shoulder 37b of said lock nut 37 and the end wall 27 of the valve casing for yieldingly urging the valve members 33 and 34 to the closed position.

The valve seat 30 is of larger diameter than the valve seat 28, whereby the force resulting from the pressure of the oxygen applied to the valve chamber 38 within the casing 26, tending to close the valve 34, is somewhat greater than the force resulting from the pressure in the chamber 38 tending to open the valve 33. This differential of force is, however, relatively small, so that a slight change in pressure in the chamber 15 may be operative to open and close the valve 17 through the medium of the diaphragm 14.

The linkage connecting the valve 17 to the diaphragm 14 includes a stem 39 attached to the valve 34, a pin 40 mounted transversely in the stem 39, a bellcrank lever 41 pivoted at 42 in a bracket 43 secured to the housing member 11, the bell crank lever 41 having a pair of relatively short arms 44 in which the ends of the pin 40 are mounted and relatively long arms 45, the ends of which are formed with clevis members 46. Linked to the clevis members 46 by pins 47 are the arms of a yoke 48 which engages the under one of a pair of reenforcing discs 49 secured to the central area of the diaphragm 14.

The cover member 12 is formed with a threaded collar 51 onto which is threaded an adjusting knob 52 having a hub portion 53 which projects into the collar 51. The hub portion 53 bears against a compression spring 54 which in turn bears against a transverse member 55 of a lever 56. The lever 56 (Fig. 4) is pivoted at one end, by a pivot 57, to a pair of ears 58 on a bracket 59 which is secured to the inner side of the cover member 12. The other end of the lever 56 is pivoted to the intermediate region of a pair of lever arms 61 by means of a pin 60 and slots 60a, said lever arms 61 being pivoted, at 62, to ears 63 on the bracket 59. The lever arms 61 at their opposite ends are joined by a transverse bearing member 64 which bears against the disc 49 of the diaphragm 14.

By rotating the knob 52 clockwise, it will be advanced toward the diaphragm 14, compressing the spring 54 and increasing the force with which the bearing member 64 engages the disc 49. The position of adjustment is determined by a plurality of scale marks 65 on the dial face of the knob 52, cooperating with a scale mark 66 on the cover 12. Such numerals may indicate pressure of a water column or any other desired designation of pressure. The knob is yieldingly retained in any one of its several adjusted positions by a spring 67 having a detent 68 adapted to engage in any one of a plurality of notches 69 in the hub member 53 (Fig. 6). The notches 69 correspond in position to the dial marks 65. The spring 67 is in the form of an inverted yoke having an apertured web portion through which the spring 54 extends. The cover 12 and bracket 59 also are apertured to accommodate the spring 54.

In the operation of the invention, the force exerted by the oxygen pressure in the chamber 15 will balance the force exerted by the air pressure in the chamber 16 which communicates freely with atmosphere, by means of peripherally spaced openings 12a in the casing section 12, plus the force exerted by the lever 61 which in turn is connected through the lever 56 with the spring 54. When the user is not inhaling, these forces will balance the diaphragm 14 in a neutral position in which the valves 33 and 34 will engage the seats 28 and 30 so as to seal off the escape of oxygen from the connection 18 into the chamber 15. The valves will be held in closed position by the linkage, including the stem 39, the lever 41 and the yoke 48, since the latter is attached to the disc 49 which in turn is attached to the diaphragm. The amount of closing force exerted through the linkage is slight, however, and the seating of the valves is assisted by the slight differential of the force resulting from the oxygen pressure in the valve chamber 38, against the valve 34 tending to close the valve, over the force against the valve 33, tending to open the valve.

With the forces thus balanced, the inhalation of oxygen through the mask 24 will result in a reduction in pressure in the chamber 15, causing the diaphragm 14 to move the valve 17 under the force of the spring 54 and to transmit such movement through the yoke 48, bell crank lever 41, and stem 39 to the valves 33 and 34 to open the valves and permit a flow of oxygen under pressure from the connection 18 into the chamber 15. This flow will continue as long as the user inhales so as to continue the evacuation of the chamber 15, but as soon as inhalation ceases, the flow of oxygen will rapidly restore the pressure in the chamber 15 to the previous level at which the diaphragm 14 is moved back to neutral position, closing the valve 17. Exhalation will then cause the exhalation valve 25 in the mask 24 to open to discharge the exhaled gases. The exhalation valve 25 is set to open at a predetermined differential between the pressures in the mask 24 and the tube 23 which is caused by the build up of pressure in the mask 24 caused by exhalation.

The bell crank lever 41 gives a mechanical advantage such as to cause the valve 17 to open and close in response to slight variations in pressure in the chamber 15.

The lever mechanism, which transmits the spring force to the top of the diaphragm, provides an inverse mechanical advantage between spring and diaphragm. This allows the use of a relatively high rate spring, yet provides the equivalent of a low-rate spring in its application of force to the top of the diaphragm, this compression being provided by one rotation or less of the adjusting knob.

I claim as my invention:

1. An oxygen demand regulator for an oxygen mask having a breathing connection comprising: a pressure sensitive diaphragm; means cooperating with said diaphragm to define a pressure chamber; outlet means for said chamber adapted to be connected only to the breathing connection of said oxygen mask so that inhalation through said connection may lower the pressure in said chamber; a valve within said chamber comprising a valve casing having opposed outlet ports and a pair of valve seats associated with said ports and disposed respectively interiorly and exteriorly of said casing; a pair of valve elements cooperating with the respective valve seats; an inlet connection to said valve casing for delivering into said casing oxygen under pressure which will result in fluid forces acting against said valve elements in opening and closing directions respectively with a slight differential in the closing direction, whereby said valves may respond to slight opening and closing forces to respectively permit the flow of oxygen under pressure into said chamber and to seal off said connection from the escape of oxygen into said chamber; and linkage connecting said diaphragm to said valve and adapted to operate same in response to inhalation and exhalation.

2. An oxygen demand regulator comprising: a diaphragm; a pair of casing members secured together with said diaphragm clamped therebetween to define a pressure chamber and a balancing chamber; an outlet for said balancing chamber connected to atmosphere; a single outlet for said pressure chamber; a valve in said pressure chamber, including a valve casing having a plurality of outlet ports and valve members cooperating with said ports, a valve stem movable substantially parallel to said diaphragm and attached to said valve members for transmitting opening and closing movements thereto; an inlet to said valve casing for admitting oxygen under pressure; linkage connecting said valve stem to said diaphragm for transmitting diaphragm movement to the valve members, said linkage comprising a bell crank lever having a short arm pivoted to said valve stem and a pair of long arms embracing said valve casing, and a yoke having a pair of arms embracing said valve casing and pivoted to said bell crank arms, said yoke including a central portion secured to said diaphragm; and means, including a force modifying leverage system, in said balancing chamber for exerting a variable force against said diaphragm to balance the force resulting from the pressure of oxygen in said chamber acting against the other side of said diaphragm.

3. An oxygen demand regulator for an oxygen mask having a breathing connection, comprising: a pressure sensitive element; means cooperating with said element to define a pressure chamber; an outlet for said chamber adapted to be connected to the breathing connection of said oxygen mask so that inhalation through said connection may lower the pressure in said chamber; a valve in said chamber for controlling the flow of oxygen therethrough, said valve comprising a casing having opposed outlet ports and a pair of valve seats associated with said ports, one interiorly and the other exteriorly of said casing, the interior valve seat being of very slightly larger diameter than the exterior valve seat, and a pair of valve elements connected together for simultaneous movement and cooperating with said valve seats; an inlet for delivering into said valve casing oxygen under pressure which will result in fluid forces acting against said valve elements tending to open one and to close the other with a small differential of force in the closing direction which assists in maintaining said valve closed; and linkage connecting said valve elements to said pressure sensitive element for opening and closing said valve elements in response to respective movements of said pressure sensitive element and effecting opening of said valve in response to inhalation through said breathing connection, said linkage being such as to multiply the forces applied by said pressure sensitive element to said valve elements.

4. An oxygen demand regulator comprising: a diaphragm; a pair of casing members secured together with said diaphragm clamped therebetween to define a pressure chamber and a balancing chamber; an outlet for said balancing chamber connected to atmosphere, said pressure chamber having an outlet; a valve in said pressure chamber, including a valve casing having a plurality of outlet ports and valve members cooperating with said ports, a valve stem movable substantially parallel to said diaphragm and attached to said members for transmitting opening and closing movements thereto; an inlet to said valve casing, connected with a source of oxygen under pressure; linkage connecting said valve stem to said diaphragm for transmitting diaphragm movement to said valve elements, said linkage comprising a bell crank lever having a short arm pivoted to said valve stem and a pair of long arms embracing said valve casing, and a yoke having a pair of arms embracing said valve casing and pivoted to said bell crank arms, said yoke including a central portion secured to said diaphragm; a pair of levers in said balancing chamber operably pivoted to said casing and to each other, one of said levers having an arcuate part adjacent the free end thereof bearing against said diaphragm in opposition to the force resulting from oxygen pressure in said pressure chamber; a compression spring engaging the other of said levers; and an adjusting nut threadably connected to the casing member which defines said balancing chamber, and engaging said compression spring.

HERMAN P. ROTH.

REFERENCES CITED

The following references are of record in the file of this patent:

UNITED STATES PATENTS

| Number | Name | Date |
|---|---|---|
| 338,353 | Morris et al. | Mar. 23, 1886 |
| 410,178 | McElroy | Sept. 3, 1889 |
| 890,238 | Kenton | June 9, 1908 |
| 925,812 | Jahn | June 22, 1909 |
| 952,416 | Chase | Mar. 15, 1910 |
| 1,131,490 | Drager | Mar. 9, 1915 |
| 1,649,566 | Bryant | Nov. 15, 1927 |
| 1,892,883 | Goldkamp | Jan. 3, 1933 |
| 1,922,954 | Hughes | Aug. 15, 1933 |
| 2,310,022 | Heidbrink | Feb. 2, 1943 |
| 2,310,189 | Deming | Feb. 2, 1943 |
| 2,378,468 | Deming | June 19, 1945 |
| 2,387,123 | Deming | Oct. 16, 1945 |